United States Patent Office 2,960,409
Patented Nov. 15, 1960

2,960,409
MALTING PROCESS

Alan Macey and Keith C. Stowell, Newark-on-Trent, England, assignors to Associated British Maltsters Limited, Newark-on-Trent, England, a British company No Drawing. Filed July 7, 1959, Ser. No. 825,402

Claims priority, application Great Britain Sept. 26, 1955

8 Claims. (Cl. 99—27)

This application is a continuation in part of our application Serial No. 609,071 filed September 11, 1956 for Malting Process, now abandoned.

This invention relates to the malting of matured cereal grains having a germination percentage of at least 95% and is of especial importance in the malting of matured barley, in connection with which the invention will be particularly described. It will be understood, however, that the method may be applied to the malting of other cereal grains, e.g. wheat.

In the malting of barley as commonly practised at the present time the matured grain having a germination percentage of at least 95% is first steeped in water, generally in two or more changes of water, the overall steeping time being usually about 35–70 hours. The water is then drained away and the grain is placed in boxes or drums, or spread on a floor (the operation known as flooring) where it germinates with the development and growth of rootlets. During germination the grain respires and heat is generated. It is well known that during germination enzymes develop which convert the proteins and starch of the grain into simpler substances which are more soluble and/or diffusible.

When the germination has proceeded to the required extent the germination is arrested by kilning the grain, the grain being thereafter screened during which the bulk of the rootlets are removed and discarded. The discarded rootlets and the grain respiration represent a loss, the so-called "malting loss," and it is an object of the present invention to provide an improved process of malting cereal grain, particularly barley, in which this malting loss is reduced in comparison with that obtained in the currently practised processes.

According to the present invention a process of malting matured cereal grain having a germination percentage of at least 95% is characterised by the step of treating the grain at the germination stage, or prior thereto, with an aqueous liquor containing 100 to 2000 parts per million of sodium or potassium bromate. According to the invention the said bromate is applied to the matured grain having a germination percentage of at least 95% in solution either in the steeping liquor or after steeping but prior to flooring or the bromate liquor is sprinkled on the grain during the early stages of flooring.

The treatment of the matured grain during steeping is more convenient since it affords a simple way of ensuring that the bromate liquor acts uniformly on the mass of grain, i.e. the bromate is introduced as an additive to the steep water. Preferably the bromate is included in the last change of water, i.e. in the second steep water if there is one change and in the third steep water if there are two changes. The bromate may, however, be included in any of the steep waters of a series.

The bromate may be applied as a powder to the grain prior to the introduction of the second or third steep water with which it forms a solution, the water preferably being agitated to produce a uniform solution acting throughout the mass of grain. Alternatively, a stock solution may be prepared and mixed with the change water before the latter is applied to the grain or a solution of the bromate may either be sprayed on to the grain during change of water or sprayed into the second or third steep water and subsequently mixed therewith.

As indicated above, the bromate liquor should have a concentration of 100–2000 parts per million of bromate salt. The optimum concentration varies with the particular grain to be treated. A concentration of about 100 parts per million represents the minimum amount with which any really useful effect can be obtained and concentrations above 2000 parts per million are undesirable. Optimum results are generally obtained using about 400–600 parts by weight of bromate salt per million parts of water. This is about equivalent to the addition of 0.2 lb. potassium bromate added to the last steeping water per quarter of barley steeped. Of course more concentrated bromate solutions may be prepared and diluted to said concentrations in use e.g. by the steeping water.

The net effect of the treatment with bromate is to reduce the malting loss. The grain appears to grow at a slower rate and at a cooler temperature. There is less rootlet formation and the physical and chemical breakdown of the barley appears to be more complete. The rootlets which develop are healthier and bushier than those obtained in the absence of bromate though their quantity is less. It appears that the rate of respiration of the grain is reduced and that the bromate controls proteolvsis, particularly in the earlier stages of flooring. The extent of reduction of malting loss varies widely with the particular grain and the specific conditions of treatment, the reduction tending to be greater with the higher concentrations of bromate within the limits set forth above. Thus, particularly when employing lower concentrations of bromate, the reduction in malting loss may be as little as 5% but in other cases, when using the higher concentrations of bromate, reduction of as much as 40% can be achieved. These percentages are the ratio of the malting loss obtained using the bromate treatment according to the present invention to the malting loss obtained under identical conditions but with the omission of the bromate. Because of the reduction of rootlet formation and the reduced respiration of the grain, the area of the floor or the volume of the boxes or drums used during germination is reduced.

The following examples will serve to illustrate the invention but are not to be regarded as limiting it in any way:

Example I (Potassium bromate)

A malting process was carried out on a matured malting barley having a germination percentage of at least 95% by the normal process hereinbefore described. Two parallel operations were effected using in each case two steeping waters (i.e. one change of liquor). In operation A no bromate was added. In operation B potassium bromate was added at a concentration of 500 parts per million in the second steeping water only. The following results were obtained:

Malting loss, percent
A ---------------------------------- 10.7
B ---------------------------------- 8.9

Examination of the grain in operation B showed that rootlet growth was much restricted as compared with the grain in operation A—the reduction in malting loss being almost 15%.

In a further and independent malting process using two steep waters wherein, however, both steep waters were charged with potassium bromate at a concentration of 500 parts per million a greater reduction in malting loss was obtained, the overall reduction in the malting loss compared with an operation in which no bromate was used being about 40%.

*Example II (Sodium bromate)*

The procedure of Example I utilising a matured barley having a germination percentage of at least 95% was repeated i.e. using two steeping waters wherein bromate was added to the second steeping water only. In operation A no bromate was added to the steeping water but in operation B 500 parts per million of sodium bromate was added as indicated. The following results were obtained:

Malting loss, percent
A ---------------------------------- 9.7
B ---------------------------------- 8.8

It will be noted that a reduction in malting loss of nearly 12% was achieved. Rootlet growth was much restricted in test B.

*Effect of varying bromate concentration*

The effect of varying the quantity of potassium bromate will be gathered from the following results carried out in malting processes on matured grain having a germination percentage of at least 95% in which three parallel operations were conducted using in each case two steeping waters wherein for operation A 500 parts per million of potassium bromate was added to the second steeping water only, for operation B 1000 parts per million of the bromate was so added and for operation C 2000 parts per million were so added. The reductions in the malting loss for operations B and C as compared with operation A were as follows.

Malting loss, percent
B ---------------------------- 0.75 of A
C ---------------------------- 0.62 of A It is clear that for higher concentrations of the bromate salt the malting loss is reduced. However, the development of the malt from the matured barely having a germination percentage of at least 95% may be somewhat unduly restricted at these higher concentrations.

We claim:

1. A process for malting mature cereal grain having a germination percentage of at least 95% comprising applying sodium bromate as a powder to the grain, adding water to the grain to form an aqueous liquor containing 100 to 2000 parts per million of sodium bromate, steeping the grain in the aqueous liquor, thereafter allowing the grain to germinate to a required extent and then arresting germination.

2. In a process of malting mature cereal grain having a germination percentage of at least 95% the steps comprising applying potassium bromate as a powder to the grain then adding water to the grain to form an aqueous liquor containing 100 to 2000 parts per million of potassium bromate and steeping the grain in said aqueous liquor preparatory to flooring the grain.

3. In a process of malting mature cereal grain having a germination percentage of at least 95% the steps comprising applying sodium bromate as a powder to the grain then adding water to the grain to form an aqueous liquor containing 100 to 2000 parts per million of sodium bromate and steeping the grain in said aqueous liquor preparatory to flooring the grain.

4. In a process of malting mature cereal grain having a germination percentage of at least 95% the steps comprising steeping the grain in an aqueous liquor containing 100 to 2000 parts per million of a substance selected from the group consisting of potassium bromate and sodium bromate, thereafter allowing the grain to germinate to a required extent and then arresting the germination.

5. In a process of malting mature cereal grain having a germination percentage of at least 95% the steps comprising steeping the grain preparatory to its flooring in an aqueous liquor containing 100 to 2000 parts per million of a substance selected from the group consisting of potassium bromate and sodium bromate, thereafter allowing the grain to germinate to a required extent and then arresting the germination.

6. A process according to claim 5 wherein the grain is steeped in an aqueous liquor containing 400 to 600 parts of potassium bromate.

7. A process according to claim 5 wherein the grain is steeped in an aqueous liquor containing 400 to 600 parts of sodium bromate.

8. In a process of malting mature barley having a germination percentage of at least 95% the steps comprising steeping the grain in an aqueous liquor containing 400 to 600 parts per million of a substance selected from the group consisting of potassium bromate and sodium bromate, thereafter allowing the grain to germinate to a required extent and then arresting the germination.

References Cited in the file of this patent

J. Inst. Brew., vol. 59, pp. 56–58 (1953).